United States Patent Office 3,322,733
Patented May 30, 1967

3,322,733
CROSS-LINKING ACRYLIC POLYMERS
David S. Breslow and Frank E. Piech, Wilmington, Del., assignors to Hercules Incorporated, a corporation of Delaware
No Drawing. Filed May 17, 1962, Ser. No. 195,415
14 Claims. (Cl. 260—79.3)

This invention relates to cross-linking polymers and to the vulcanizates so produced. More particularly, the invention relates to cross-linking acrylic polymers with polysulfonazides.

Polyacrylates and polymethacrylates are well known for their ability to be molded, cast, and extruded into many useful articles and to be formulated into coating compositions. However, the end products all suffer a serious drawback in that they are soluble in most organic solvents.

It has now been discovered that many of the acrylic polymers can be cross-linked by heating in the presence of a polysulfonazide to produce vulcanizates that are solvent resistant and have increased hardness and stiffness.

Any acrylic polymer, homopolymer or copolymer containing at least about 10 mole percent of a component having the formula

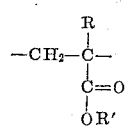

where R is a hydrogen or methyl radical and R' is an aliphatic radical containing at least 2, and preferably 2 to 15, carbon atoms can be cross-linked by the process of this invention. The process is applicable whether the polymer is to be cast, molded, extruded or formulated in a coating composition. Exemplary of the acrylic polymers that can be cross-linked are poly(ethyl methacrylate), poly(n-butyl methacrylate), poly(n-propyl methacrylate), poly(propylene methacrylate), poly(n-octyl methacrylate), poly(ethyl acrylate), poly(n-butyl acrylate), poly(butylene acrylate), poly(n-hexyl acrylate), poly(n-decyl acrylate), ethyl methacrylate-n-butyl acrylate copolymers, methyl methacrylate-ethyl methacrylate copolymers (containing at least 10 mole percent of ethyl methacrylate), n-butyl acrylate-methyl methacrylate copolymers (containing at least 10 mole percent of n-butyl acrylate), ethyl methacrylate-butadiene copolymers (containing at least 10 mole percent of ethyl methacrylate), n-propyl acrylate-vinyl acetate copolymers (containing at least 10 mole percent of n-propyl acrylate), n-butyl methacrylate-β-chloroethyl vinyl ether copolymers (containing at least 10 mole percent of n-butyl methacrylate), ethyl methacrylate-dehydrated castor oil copolymers (containing at least 10 mole percent of ethyl methacrylate), ethyl acrylate-styrene copolymers (containing at least 10 mole percent of ethyl acrylate), n-propyl acrylate-acrylonitrile copolymers (containing at least 10 mole percent of n-propyl acrylate), ethyl methacrylate-maleic anhydride copolymers (containing at least 10 mole percent of ethyl methacrylate), methyl methacrylate-ethyl acrylate-allyl methacrylate terpolymer (containing at least 10 mole percent of ethyl acrylate or allyl methacrylate), etc.

Any polysulfonazide, i.e., any compound having the general formula $$R\text{-}[SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and alkarylene radicals; however, these radicals can also contain ether, alcohol, etc., groups which are inert to the cross-linking reaction. Exemplary sulfonazides are 1,5-pentane bis(sulfonazide),
1,10-decane bis(sulfonazide),
1,3-benzene bis(sulfonazide),
1-octyl-2,4,6-benzene tris(sulfonazide),
4,4'-diphenylmethane bis(sulfonazide),
4,4'-diphenyl ether bis(sulfonazide),
4,4'-bisoctadecyl biphenyl-3,5,3',5'-tetra(sulfonazide),
4,4'-diphenyl disulfide bis(sulfonazide),
1,6-bis(4'-sulfonazidophenyl) hexane,
2,7-naphthalene bis(sulfonazide), etc.

Unlike peroxide or azo compounds which upon heating produce a free radical, the polysulfonazides produce a nitrene, i.e., a nitrogen containing a sextet of electrons. Therefore, the type of cross-linking obtained with a polysulfonazide is quite different from that obtained with a free radical generator.

The cross-linking process of this invention can be carried out by heating the acrylate polymer in the presence of a polysulfonazide to a temperature at which the sulfonazide decomposes. The temperature will vary over a wide range, but in general will be in the range of from about 100° C. to about 250° C. Various amounts of the cross-linking agent can be added, the optimum amount depending on the amount of cross-linking desired, the specific sulfonazide employed, etc. In general, the amount added, based on the weight of the polymer, will be from about 0.1% to about 25%.

The cross-linking agent can be incorporated with the polymer in any desired fashion. For example, it can be uniformly blended by simply milling on a conventional rubber mill, dissolved or dispersed in a solution containing the polymer or dissolved or dispersed in a latex containing the polymer. By these means, the polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can be incorporated in the polymer. Exemplary of such ingredients are extenders, fillers, pigments, plasticizers, stabilizers, etc. Obviously, there are many cases in which these ingredients are not required or desired, and excellent results are achieved when only the cross-linking agent is added.

The use of polysulfonazide cross-linking agents is particularly advantageous in coating compositions prepared from acrylic polymers.

The following examples are presented for purposes of illustration, parts and percentages being by weight unless otherwise specified.

*Examples 1 and 2*

Two samples of different acrylic polymers were cross-linked with 1,3-benzene disulfonazide. The formulation of each sample was as follows:

| | Parts |
|---|---|
| Acrylic polymer | 100 |
| Solvent [1] | 400 |
| 1,3-benzene disulfonazide (20% solids in acetone) | 25 |

Controls were prepared as above but without the disulfonazide cross-linking agent. The resulting lacquers were sprayed on phosphate-treated steel panels. The panels were air dried overnight and then baked for 30

---

[1] 40% toluene, 40% methyl isobutyl ketone, 5% butanol and 15% of the acetate ester of ethylene glycol monoethyl ether.

minutes at a temperature of 175° C. Each of the coated panels was tested by soaking in acetone for 2 hours at 25° C. The results of these tests are shown in Table I.

TABLE I

| Examples | Acrylic Polymers | Solubility | |
|---|---|---|---|
| | | Sample Containing Disulfonazide | Control |
| 1 | Poly(ethyl methacrylate) | Insoluble | Soluble. |
| 2 | Poly(n-butyl methacrylate) | do | Do. |

*Example 3*

A sample of methyl methacrylate-ethyl methacrylate copolymer containing 50 mole percent methacrylate was cross-linked with 1,3-benzene disulfonazide as follows. To 50 parts of a 20% solution of the copolymer in the solvent described in Examples 1 and 2 was added 2.5 parts of a 20% solution of the disulfonazide in acetone. A control sample was prepared in the same manner except for the disulfonazide cross-linking agent. The resulting lacquers were sprayed on phosphate-treated steel panels and allowed to air dry overnight. Each panel was baked for 30 minutes at a temperature of 175° C. and then tested by soaking in acetone for 2 hours at 25° C. The coating containing the disulfonazide was insoluble while the coating on the control panel completely dissolved.

*Example 4*

To a solution of one part of poly(ethyl acrylate) in 80 parts of methylethyl ketone was added 0.05 part of 1,3-benzene disulfonazide in a chloroform solution. After agitating for 2 hours, the solvents were evaporated at room temperature. The polymer was then cured for 30 minutes at a temperature of 175° C. under a pressure of 800 p.s.i. in an aluminum mold. The resulting vulcanizate was insoluble in an excess of methylethyl ketone at 60° C. while an untreated control sample was completely soluble.

*Examples 5 and 6*

Two samples of different acrylic polymers were cross-linked with 1,10-decane bis(sulfonazide). The formulation of each sample was as follows:

| | Parts |
|---|---|
| Acrylic polymer | 100 |
| Solvent [1] | 400 |
| 1,10-decane bis(sulfonazide) | 5 |

[1] Same solvent as used in Examples 1 and 2.

Controls were prepared as above but without the disulfonazide cross-linking agent. The resulting lacquers were sprayed on phosphate-treated steel panels. The panels were air dried overnight and then baked for 30 minutes at a temperature of 175° C. Each of the coated panels was tested by soaking in acetone for 2 hours at 25° C. The results of these tests are shown in Table II.

TABLE II

| Examples | Acrylic Polymers | Solubility | |
|---|---|---|---|
| | | Sample Containing 1,10-decane bis(sulfonazide) | Control |
| 5 | Poly(ethyl methacrylate) | Insoluble | Soluble. |
| 6 | Poly(n-butyl methacrylate) | do | Do. |

What we claim and desire to protect by Letters Patent is:

1. A process of cross-linking a polymer containing at least about 25 mole percent of a component having the formula

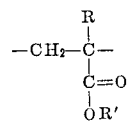

where R is a radical selected from the group consisting of hydrogen and methyl radicals and R' is an aliphatic radical containing at least 2 carbon atoms, which comprises heating said polymer in the presence of a polysulfonazide cross-linking agent having the formula $$R(SO_2N_3)_x$$

where $x$ is an integer greater than 1 and R is an organic radical selected from the group consisting of alkylene, arylene, aralkylene and alkarylene radicals.

2. The process of claim 1 wherein the polymer is poly(ethyl methacrylate).

3. The process of claim 1 wherein the polymer is poly(n-butyl methacrylate).

4. The process of claim 1 wherein the polymer is poly(ethyl acrylate).

5. The process of claim 1 wherein the polymer is a methyl methacrylate-ethyl methacrylate copolymer.

6. The process of claim 1 wherein the polysulfonazide is 1,3-benzene disulfonazide.

7. The process of claim 1 wherein the polysulfonazide is 1,10-decane bis(sulfonazide).

8. A polymer containing at least about 25 mole percent of a component having the formula

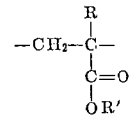

where R is a radical selected from the group consisting of hydrogen and methyl radicals and R' is an aliphatic radical containing at least 2 carbon atoms cross-linked with a polysulfonazide having the formula $$R(SO_2N_3)_x$$

where $x$ is an integer greater than 1 and R is an organic radical selected from the group consisting of alkylene, arylene, aralkylene and alkarylene radicals.

9. The product of claim 8 wherein the polymer is poly(ethyl methacrylate).

10. The product of claim 8 wherein the polymer is poly(n-butyl methacrylate).

11. The product of claim 8 wherein the polymer is poly(ethyl acrylate).

12. The product of claim 8 wherein the polymer is a methyl methacrylate-ethyl methacrylate copolymer.

13. A process of cross-linking an acrylic homopolymer having the formula

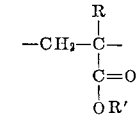

where R is a radical selected from the group consisting of hydrogen and methyl radicals and R' is an aliphatic radical containing at least 2 carbon atoms, which comprises heating said polymer in the presence of a polysulfonazide cross-linking agent having the formula $$R(SO_2N_3)_x$$

where $x$ is an integer greater than 1 and R is an organic radical selected from the group consisting of alkylene, arylene, aralkylene and alkarylene radicals.

14. An acrylic homopolymer having the formula

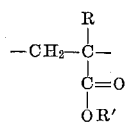

where R is a radical selected from the group consisting of hydrogen and methyl radicals and R' is an aliphatic radical containing at least 2 carbon atoms cross-linked with a polysulfonazide having the formula $$R(SO_2N_3)_x$$

where $x$ is an integer greater than 1 and R is an organic radical selected from the group consisting of alkylene, arylene, aralkylene and alkarylene radicals.

References Cited

UNITED STATES PATENTS

| | | | |
|---|---|---|---|
| 2,532,243 | 11/1950 | Ott | 260—2.5 |
| 2,600,414 | 6/1952 | Mast et al. | 260—79.5 |
| 2,764,599 | 9/1956 | Clifford et al. | 260—2.5 |
| 2,828,299 | 3/1958 | Von Glahn | 260—2.5 |
| 2,830,029 | 4/1958 | Adams | 260—2.5 |
| 3,058,944 | 10/1962 | Breslow et al. | 260—79.3 |
| 3,058,957 | 10/1962 | Breslow | 260—79.3 |

JOSEPH L. SCHOFER, *Primary Examiner.*

WILLIAM H. SHORT, *Examiner.*

D. K. DENENBERG, M. P. HENDERICKSON,
*Assistant Examiners.*